United States Patent
Taguchi et al.

(10) Patent No.: US 7,891,704 B2
(45) Date of Patent: Feb. 22, 2011

(54) SIDE AIRBAG DEVICE

(75) Inventors: Seigo Taguchi, Hiroshima (JP); Naoki Kaneko, Hiroshima (JP); Masaki Motoki, Hiroshima (JP); Kazuya Fukutani, Hiroshima (JP)

(73) Assignee: Mazda Motor Corporation (JP)

( * ) Notice: Subject to any disclaimer, the term of this patent is extended or adjusted under 35 U.S.C. 154(b) by 144 days.

(21) Appl. No.: 11/808,633

(22) Filed: Jun. 12, 2007

(65) Prior Publication Data

US 2007/0290488 A1 Dec. 20, 2007

(30) Foreign Application Priority Data

Jun. 20, 2006 (JP) ............................. 2006-170399
Apr. 10, 2007 (JP) ............................. 2007-102788

(51) Int. Cl.
*B60R 21/239* (2006.01)
(52) U.S. Cl. .................... 280/739; 280/729; 280/730.2; 280/743.2
(58) Field of Classification Search ................. 280/729, 280/730.2, 739, 743.2
See application file for complete search history.

(56) References Cited

U.S. PATENT DOCUMENTS

| | | | | |
|---|---|---|---|---|
| 5,791,685 | A * | 8/1998 | Lachat et al. ............. | 280/743.1 |
| 2003/0160433 | A1 * | 8/2003 | Kumagai et al. ............ | 280/729 |
| 2003/0168836 | A1 * | 9/2003 | Sato et al. ................ | 280/730.2 |
| 2004/0021304 | A1 * | 2/2004 | Tanase et al. ............... | 280/729 |
| 2004/0119269 | A1 * | 6/2004 | Yokota et al. ............. | 280/730.2 |
| 2004/0130127 | A1 * | 7/2004 | Kurimoto et al. ........... | 280/729 |
| 2005/0023808 | A1 * | 2/2005 | Sato et al. ................ | 280/730.2 |
| 2005/0062266 | A1 * | 3/2005 | Steimke et al. ........... | 280/730.2 |
| 2005/0098985 | A1 * | 5/2005 | Sullivan et al. ............. | 280/729 |
| 2005/0104342 | A1 * | 5/2005 | Jackson et al. ........... | 280/730.2 |
| 2005/0184493 | A1 * | 8/2005 | Hofmann et al. ......... | 280/730.2 |
| 2005/0189742 | A1 * | 9/2005 | Kumagai et al. ......... | 280/730.2 |
| 2005/0248132 | A1 * | 11/2005 | Wheelwright ............... | 280/729 |

(Continued)

FOREIGN PATENT DOCUMENTS

EP 0 999 101 5/2000

(Continued)

OTHER PUBLICATIONS

Extended European Search Report Application No. EP 07 01 2070 dated Oct. 23, 2007.

*Primary Examiner*—Toan C To
*Assistant Examiner*—Barry Gooden, Jr.
(74) *Attorney, Agent, or Firm*—Studebaker & Brackett PC; Donald R. Studebaker

(57) ABSTRACT

A side airbag device provided at a seat back of a seat, comprises an airbag including a chest-abdomen protection portion to protect a chest and abdomen of an occupant seated and a waist protection portion to protect a waist of the occupant, and an inflator to supply gas to the airbag for an inflation at a vehicle side crash or a vehicle turnover, wherein the portions are partitioned by a partition portion that at least extends substantially rearward from an front edge of the airbag, and a recess is provided at an upper portion of the chest-abdomen protection portion. Accordingly, a whole part of side body including the chest, abdomen and waist can be properly protected regardless of the body size of the occupant, even for the occupant having the relatively small body size.

4 Claims, 15 Drawing Sheets

U.S. PATENT DOCUMENTS

| | | | |
|---|---|---|---|
| 2006/0001244 A1* | 1/2006 | Taguchi et al. | 280/729 |
| 2006/0022439 A1* | 2/2006 | Bayley et al. | 280/729 |
| 2006/0022441 A1* | 2/2006 | Hayashi et al. | 280/730.2 |
| 2006/0043702 A1* | 3/2006 | Jamison | 280/729 |
| 2006/0071458 A1* | 4/2006 | Sendelbach et al. | 280/729 |
| 2006/0103119 A1* | 5/2006 | Kurimoto et al. | 280/730.2 |
| 2006/0103120 A1* | 5/2006 | Kurimoto et al. | 280/730.2 |
| 2006/0131847 A1* | 6/2006 | Sato et al. | 280/730.2 |
| 2006/0175809 A1* | 8/2006 | Yamaji et al. | 280/729 |
| 2006/0232054 A1* | 10/2006 | Schlosser et al. | 280/743.2 |
| 2006/0267318 A1* | 11/2006 | Nishikaji et al. | 280/730.2 |
| 2007/0126220 A1* | 6/2007 | Huber et al. | 280/740 |
| 2007/0152430 A1* | 7/2007 | Wollin et al. | 280/729 |
| 2007/0200327 A1* | 8/2007 | Kloss et al. | 280/740 |
| 2007/0228699 A1* | 10/2007 | Bederka et al. | 280/730.2 |
| 2007/0267851 A1* | 11/2007 | Svenbrant et al. | 280/729 |
| 2008/0100045 A1* | 5/2008 | Fukawatase et al. | 280/730.2 |

FOREIGN PATENT DOCUMENTS

| | | |
|---|---|---|
| EP | 1 586 489 | 10/2005 |
| GB | 2 403 457 | 1/2005 |
| JP | 2005-186891 | 7/2005 |
| WO | WO 2005/113300 | 12/2005 |

* cited by examiner

SIDE AIRBAG DEVICE

BACKGROUND OF THE INVENTION

The present invention relates to a side airbag device, and in particular, relates to a side airbag device that is provided at a seat back of a seat for a vehicle.

Conventionally, various types of side airbag device that can protect an occupant in the vehicle with an airbag inflated by gas supplied from an inflator at a vehicle side crash or a vehicle turnover have been proposed.

US Patent Application Publication No. 2004/0130127 A1 discloses an airbag device for a vehicle side crash, in which an airbag that is partitioned into its lower chamber and its upper chamber by a seam is provided at an outer side of a seat back of a seat. In this airbag device, when there occurs the vehicle side crash or the vehicle overturn, a gas generator (inflator) generates and supplies gas into the lower and upper chambers, thereby the respective chambers are inflated, so that the airbag can be inflated along a window side of the seat. Herein, a larger volume of gas with a higher pressure gas is supplied into the lower chamber compared to gas supplied to the upper chamber. Accordingly, since the lower chamber is inflated earlier, it can receive a waist of the occupant properly by moving it laterally. Meanwhile, since the upper chamber is inflated by the gas with a lower pressure, it can receive an upper body of the occupant softly.

Japanese Patent Laid-Open Publication No. 2005-186891 discloses a side airbag device, in which an airbag includes an upper airbag chamber to protect a chest and a abdomen of the occupant and a lower airbag chamber to protect a waist of the occupant. Herein, this airbag has a sewing portion to control a pressure difference between both chambers to a specified desired value, and, an inner pressure of the lower airbag chamber is adjusted to be higher than that of the upper airbag chamber. Thus, the lower airbag chamber of this side airbag device is also configured so as to be inflated earlier than the upper airbag chamber.

The conventional airbag devices disclosed in the above-described patent publications may be superior in protecting a whole part of the occupant's side body with the upper chamber (upper airbag chamber) for softly protecting the occupant's chest and abdomen and with the lower chamber (lower airbag chamber) for receiving the occupant's waist by moving it laterally. However, these airbag devices may perform its superior function for the occupant that has a relatively large body size, but it could not necessarily provide its proper protection to the occupant that has a relatively small or middle body size (such as a female driver). This is because the upper chamber (upper airbag chamber) is located at a portion where an upper arm of the occupant having the relatively small or middle body size is positioned, so the occupant's upper arm is pushed by this upper chamber with its relatively high gas pressure. This pushing would cause an uncomfortable feeling to the occupant having the relatively small or middle body size. The occupant would feel uncomfortable in its upper arm or its side body.

It is preferable to inflate the airbag with the higher pressure from perspectives of receiving the occupant's waist properly by moving it laterally and obtaining a prompt (earlier) inflation of the airbag. To the contrary, however, this higher pressurization would deteriorate the above-described uncomfortable feeling that the occupant may have. No conventional side airbag device that may solve this problem effectively to provide the proper protection at the vehicle side crash or the overturn regardless of the body size of the occupant has been proposed yet.

SUMMARY OF THE INVENTION

The present invention has been devised in view of the above-described problem, and an object of the present invention is to provide a side airbag device that can properly protect the whole part of side body including the chest, abdomen and waist of the occupant, regardless of the body size of the occupant, even for the occupant having the relatively small body size.

According to the present invention, there is provided a side airbag device, which is provided at a seat back of a seat for a vehicle, comprising an airbag including a chest-abdomen protection portion operative to inflate so as to protect a chest and an abdomen of an occupant seated in the seat and a waist protection portion operative to inflate so as to protect a waist of the occupant seated, and an inflator operative to supply gas to the airbag for an inflation of the airbag at a vehicle side crash or a vehicle turnover, wherein the chest-abdomen protection portion and the waist protection portion of the airbag are partitioned by a partition portion that at least extends substantially rearward from an front edge of the airbag, and an inflation restriction portion is provided at an upper portion of the chest-abdomen protection portion of the airbag.

According to the present invention, when there occurs the vehicle side crash or the vehicle overturn, the airbag is inflated by the gas supplied thereinto from the inflator. Herein, the waist protection portion of the airbag is inflated so as to protect the occupant's waist by pushing it out laterally. Meanwhile, the chest-abdomen protection portion of the airbag can be properly inflated with a relatively small amount of gas volume because of the inflation restriction portion provided at this portion. Namely, the inflation of the chest-abdomen protection portion can be improved even with the gas of small amount of volume, so that the chest-abdomen protection portion can secure its vertically-long enough protection area even for the occupant having the relatively large body size, thereby improving the occupant's protection. Moreover, since the inflation restriction portion is provided at the upper portion of the chest-abdomen protection portion of the airbag, the upper arm portion of even the occupant having the relatively small or middle body size can be properly prevented from being pushed inwardly by the chest-abdomen protection portion inflated.

According to an embodiment of the present invention, the inflation restriction portion provided at the chest-abdomen protection portion is configured such that a horizontal distance between at least a portion of an upper portion of a front edge portion of the chest-abdomen protection portion and a front face of a seat back of the seat is shorter than a horizontal distance between a lower portion of the front edge portion of the chest-abdomen protection portion and the front face of the seat back of the seat, when viewed from a vehicle width direction. Thereby, the inflation restriction portion is positioned at a location of the upper arm portion of the occupant having the relatively small or middle body size, so that the upper arm of the occupant can be properly prevented from being pushed inwardly by the chest-abdomen protection portion inflated.

According to another embodiment of the present invention, the inflation restriction portion is a recess that is formed so as to retreat rearward at the front edge portion of the chest-abdomen protection portion. Thereby, since the recess is provided at the chest-abdomen protection portion, the chest-abdomen protection portion can be properly inflated with the relatively small amount of gas volume. Accordingly, the chest-abdomen protection portion can secure its vertically-long enough protection area even for the occupant having the relatively large body size, thereby improving the occupant's protection. Moreover, since the recess is provided at the chest-abdomen protection portion of the airbag, the upper arm portion of the occupant having the relatively small or middle body size can be properly prevented from being pushed inwardly by the chest-abdomen protection portion inflated.

According to another embodiment of the present invention, the inflation restriction portion is an non-inflatable portion that is formed at a specified portion of the chest-abdomen protection portion, which is located substantially at a front side of the chest-abdomen protection portion and at a middle level in a vertical direction of the chest-abdomen protection portion. Thereby, since the chest-abdomen protection portion can be properly inflated with the relatively small amount of gas volume because of providing the non-inflatable portion, it can secure its vertically-long enough protection area even for the occupant having the relatively large body size, thereby improving the occupant's protection. Moreover, since the non-inflatable portion is provided at the chest-abdomen protection portion of the airbag, the upper arm portion of the occupant having the relatively small or middle body size can be properly prevented from being pushed inwardly by the chest-abdomen protection portion inflated.

According to another embodiment of the present invention, the waist protection portion is connected to the chest-abdomen protection portion and configured to inflate so as to contact a seat face of the seat cushion of the seat when the airbag is inflated, and the inflation restriction portion is formed at an upper half part of the chest-abdomen protection portion. Thereby, since the waist protection portion is connected to the chest-abdomen protection portion via a connection portion, the inflation of the waist protection portion contacting the seat face of the seat cushion can be properly stabilized. Herein, the chest-abdomen protection portion may receive a reaction force from the seat cushion via the waist protection portion that inflates contacting the seat face of the seat cushion. However, since the inflation restriction portion is formed at the upper half part of the chest-abdomen protection portion, which is apart from the seat cushion, any stress can be prevented from concentrating improperly and any deterioration of the inflation of the chest-abdomen protection portion can be avoided.

According to another embodiment of the present invention, the waist protection portion is configured to inflate so as to contact a seat face of the seat cushion of the seat when the airbag is inflated, and a connection between the waist protection portion and the chest-abdomen protection portion is configured to form a substantially non-connection state. Thereby, while the inflation of the waist protection portion might deteriorate to a certain degree because the waist protection portion cannot inflate with the chest-abdomen protection portion as an unit, the chest-abdomen protection portion receives little reaction force from the seat cushion via the waist protection portion that inflates contacting the seat face of the seat cushion. Accordingly, the inflation of the chest-abdomen protection portion can improve.

According to another embodiment of the present invention, the chest-abdomen protection portion is configured such that a horizontal distance between a lower portion of the front edge portion of the chest-abdomen protection portion and a front face of a seat back of the seat is longer than a horizontal distance between a front edge portion of the waist protection portion and the front face of the seat back of the seat, when viewed from a vehicle width direction, the lower portion of the chest-abdomen protection portion is folded in such a manner that a front edge side thereof is folded toward a rear edge side thereof, and the waist protection portion is connected to the chest-abdomen protection portion. Herein, there is a concern that if the inflation of the front edge portion of the lower portion of the chest-abdomen protection portion was delayed, the front edge portion wound get stuck between a vehicle side face (such as a door trim) and the occupant and would not be properly inflated. According to the above-described embodiment, however, since the chest-abdomen protection portion is connected to the waist protection portion that can inflate earlier than the front edge portion of the lower portion of the chest-abdomen protection portion does, the front edge portion is drawn out in the inflation direction by the inflated waist protection portion. Thereby, the proper inflation of the front edge portion of the lower portion of the chest-abdomen protection portion can be secured.

According to another embodiment of the present invention, a lower portion of the chest-abdomen protection portion is folded in such a manner that a front edge side thereof is folded toward a rear edge side thereof, the waist protection portion is connected to the chest-abdomen protection portion, the lower portion of the chest-abdomen protection portion is formed in a curve shape such that a middle portion thereof in a vertical direction protrudes forward from upper and lower ends thereof, when viewed from the vehicle width direction, and a vent hole is provided at least near the upper end or the lower end of the lower portion of the chest-abdomen protection portion. Thereby, the gas pressure of the chest-abdomen protection portion can be maintained at a proper pressure during the inflation of the airbag from its initial stage to its final stage by the vent hole provided at the chest-abdomen protection portion. Further, since the vent hole is located so as not to be closed (covered) by the protruding portion of the lower portion of the chest-abdomen protection portion even if this protruding portion gets stuck between the vehicle side face (such as the door trim) and the occupant and remains folded without inflating, the proper gas exhaustion can be secured.

According to another embodiment of the present invention, a lower portion of the chest-abdomen protection portion is folded in such a manner that a front edge side thereof is folded toward a rear edge side thereof, the waist protection portion is connected to the chest-abdomen protection portion, and vent holes are provided near an upper front edge portion and a lower front edge portion of the chest-abdomen protection portion. Thereby, the chest-abdomen protection portion can be properly inflated, attaining the equalization of gas pressure by the vent holes provided near the upper front edge portion and the lower front edge portion of the chest-abdomen protection portion. Further, the proper gas exhaustion can be secured by the vent hole provided near the upper front edge portion of the chest-abdomen protection portion even if the front edge side of the lower portion of the chest-abdomen protection portion remains folded without inflating.

Other features, aspects, and advantages of the present invention will become apparent from the following description which refers to the accompanying drawings.

DETAILED DESCRIPTION OF THE INVENTION

Hereinafter, preferred embodiments of a side airbag device of the present invention will be descried referring to the accompanying drawings. It should be understood that even though embodiments are separately described, single features thereof may be combined to additional embodiments.

Figure 1:
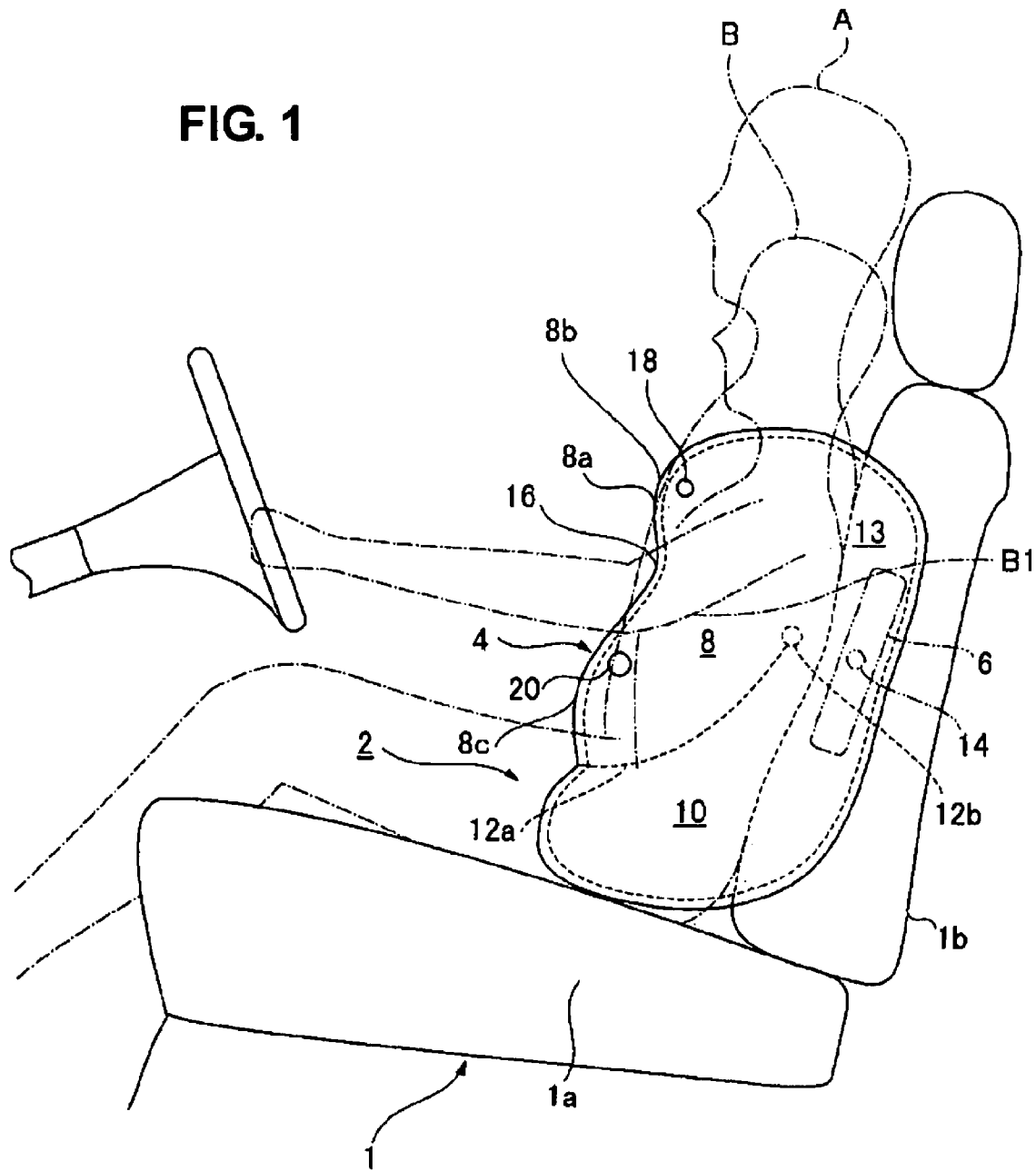
FIG. 1 is a diagram showing an inflation state of a side airbag device according to a first embodiment of the present invention, when viewed from a vehicle width direction.
Figure 2:
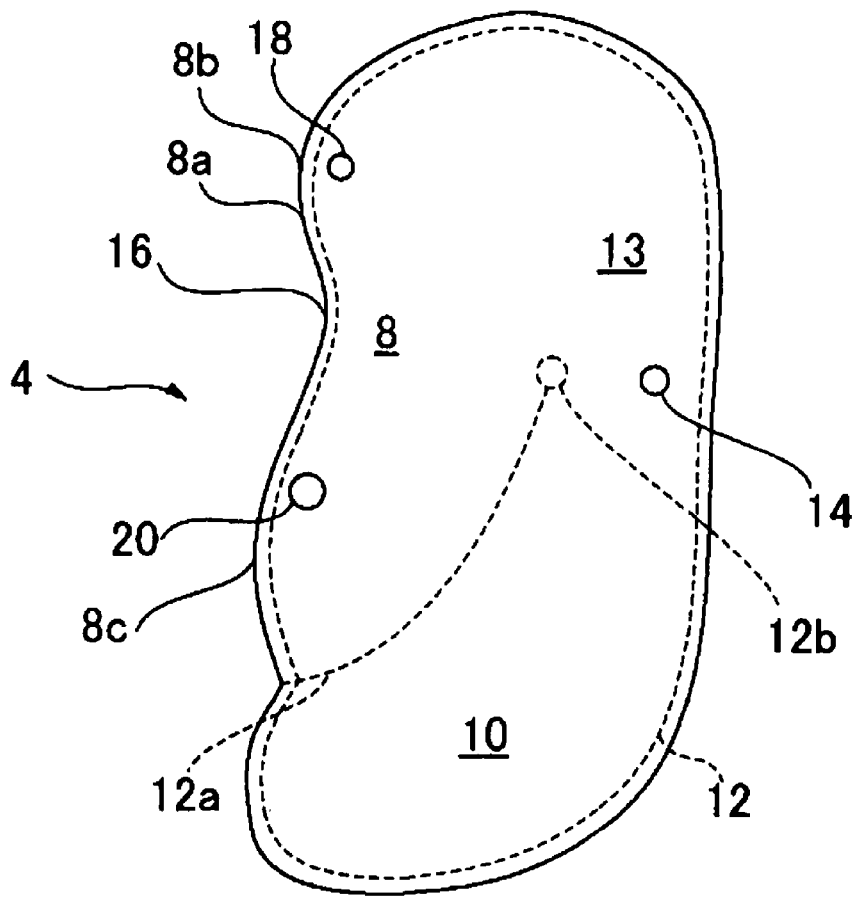
FIG. 2 is a side view of an airbag of the side airbag device of FIG. 1.
Figure 3:
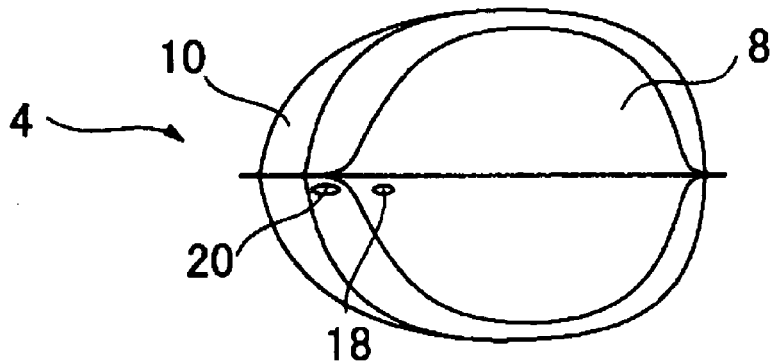
FIG. 3 is a plan view of the airbag of the side airbag device of FIG. 1.
Figure 4:
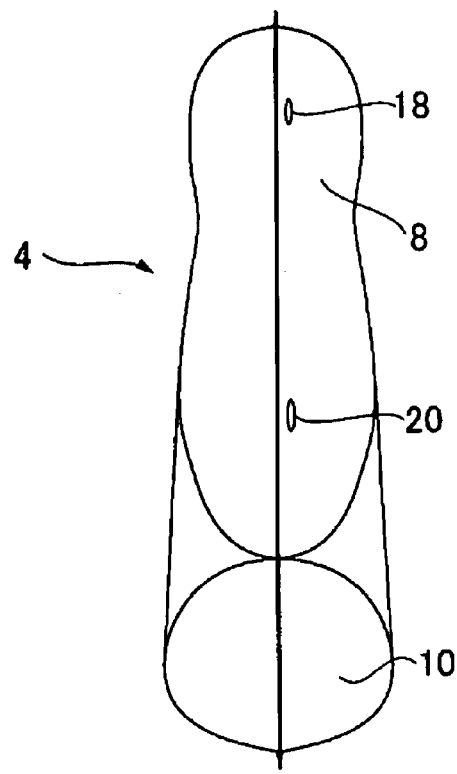
FIG. 4 is an elevation view of the airbag of the side airbag device of FIG. 1.

First, a side airbag device according to a first embodiment of the present invention will be described with FIGS. 1 to 8. FIG. 1 is a diagram showing an inflation state of the side airbag device according to the first embodiment of the present invention, when viewed from a vehicle width direction. FIG. 2 is a side view of an airbag of the side airbag device of FIG. 1. FIG. 3 is a plan view of the airbag of the side airbag device of FIG. 1. FIG. 4 is an elevation view of the airbag of the side airbag device of FIG. 1.

A seat 1 for a vehicle is provided in a cabin of the vehicle as shown in FIG. 1, which includes a seat cushion 1a, in which an occupant (passenger) is seated, and a seat back 1b, by which a back of the occupant is supported. A body size of the occupant seated in the seat 1 differs. Herein, an occupant A and an occupant B will be described as an example of the occupant. The occupant A indicates an occupant having an average body size of American male adults, which is referred to as AM50 in the US Federal Regulation Standard CRF 49ch. 5. The occupant B, meanwhile, indicates an occupant having an average body size of American female adults who belong to a relatively small body size group that ranks 5% from the smallest one, which is referred to as AF05 in this standard.

The side airbag device 2 of the first embodiment of the present invention comprises an airbag 4 to protect the occupant and an inflator 6 to supply gas to the airbag 4. The airbag 4 in a folded state and the inflator 6 are disposed inside a window-side portion of the seat back 1b of the seat 1.

Herein, the side airbag device 2 is configured to activate the inflator 6 to supply the gas when a sensor (not illustrated) detects a vehicle side crash or predicts a vehicle overturn, specifically a specified inclination of the vehicle, so that the airbag 4 can be inflated.

As shown in FIGS. 1 to 4, the airbag 4 includes a chest-abdomen protection portion 8 operative to inflate so as to protect a chest and an abdomen of the occupants A, B seated in the seat cushion 1a of the seat 1 and a waist protection portion 10 operative to inflate so as to protect a waist of the occupants A, B. These chest-abdomen protection portion 8 and the waist protection portion 10 are respectively made of two sheets of clothes with substantially the same shape that are sewed together with a sewing portion 12, illustrated by a broken line. One of the two sheets of clothes is located inside and the other is located outside when the airbag is inflated. Also, these portions 8 and 10 are connected to each other via a connection portion (partition portion) 12a, so that they can be inflated as an unit. At a rearmost end portion of the connection portion 12a is provided an non-inflatable portion 12b that forms part of the sewing portion 12. The non-inflatable portion 12b may increase a strength to prevent this portion from being broken. Insides of these portions 8 and 10 are connected at an upper portion via an upper connection area 13. A gas inlet portion 14 is formed at a rear portion of the waist protection portion 10 near the connection area 13, which is connected to a gas injection portion (not illustrated) of the inflator 6.

Herein, as shown in FIGS. 1 and 2, a recess 16 as an inflation restriction portion is provided at or near a portion of the chest-abdomen protection portion 8, which corresponds to an upper arm portion B1 of the occupant having the relatively small body size (the occupant B corresponding to AF05 described above, for instance). More specifically, the recess 16 is formed so as to retreat rearward at a front edge portion 8a of the chest-abdomen protection portion 8 between a front-edge-portion upper 8b and a front-edge-portion lower 8c. And, this recess 16 is formed at an upper half part of the chest-abdomen protection portion 8.

As shown in FIG. 1, the waist protection portion 10 is connected to the chest-abdomen protection portion 8 as described above, and configured to inflate so as to contact a seat face of the seat cushion 1a of the seat 1 when the airbag is inflated.

At the chest-abdomen protection portion 8, as shown in FIGS. 1 to 4, are formed an upper vent hole 18 at its upper portion, namely near the front-edge-portion upper 8*b* and a lower vent hole 20 at its lower portion, namely near the front-edge-portion lower 8*c*. The upper vent hole 18 has a smaller size than the lower vent holes 20 so that the exhaust-gas amount from the upper vent hole 18 is smaller than that from the lower vent hole 20. No vent hole is formed at the waist protection portion 10. It may be preferable that both holes 18, 20 be formed, but either one may be necessary.

Herein, the both vent holes 18, 20 are formed at portions that are near the center on a window side (vehicle outside) of the chest-abdomen protection portion 8, as shown in FIGS. 3 and 4. Accordingly, since the chest-abdomen protection portion 8 of the inflated airbag 4 may not contact the occupant or any vehicle door, the vent holes will not be closed and therefore a smooth exhaustion of the gas out of these holes can be secured.

The chest-abdomen protection portion 8 of the airbag 4 is configured so that the gas from the gas inlet port 14 flows down to the lower vent hole 20 passing the upper vent hole 18 or near the vent hole 18.

Figure 5:
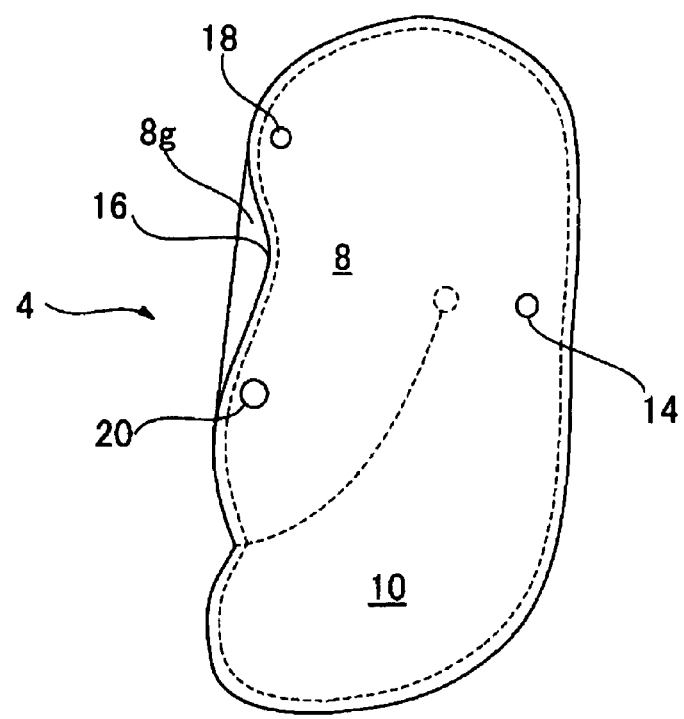
FIG. 5 is a side view of an airbag of a modified embodiment of the first embodiment of the present invention.

Next, a first modified embodiment of the airbag 4 according to the first embodiment will be described referring to FIG. 5. Herein, an non-inflatable portion 8*g* having a recess shape is formed at the front edge portion 8*a* of the chest-abdomen protection portion 8 of the inflated airbag 4, which forms the above-described recess 16.

Figure 7:
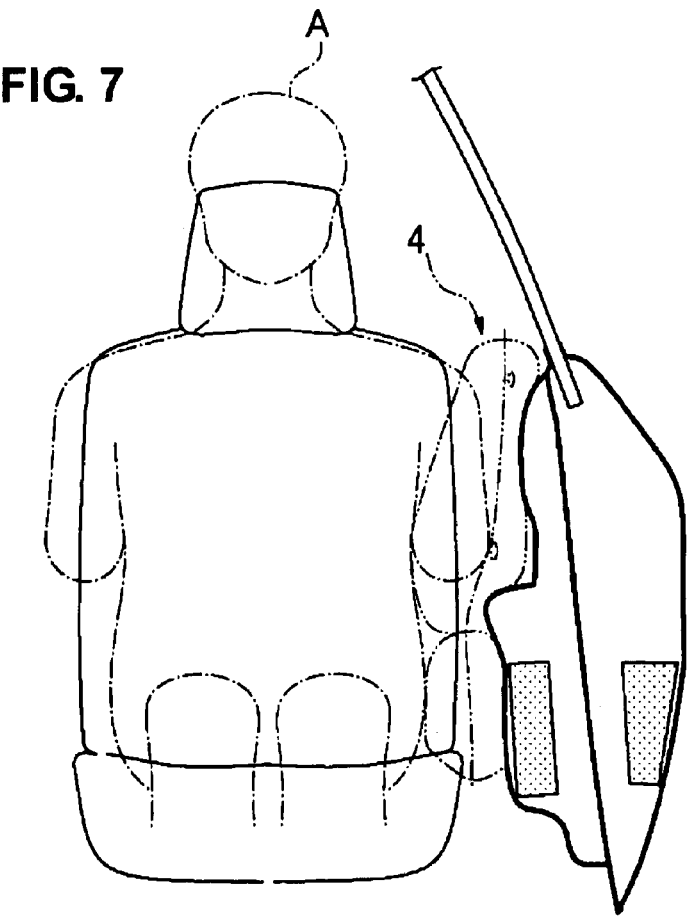
FIG. 7 is a diagram showing an inflation state of the side airbag device according to the first embodiment of the present invention, in which an occupant having a large body size is seated, when viewed from a vehicle front.
Figure 8:
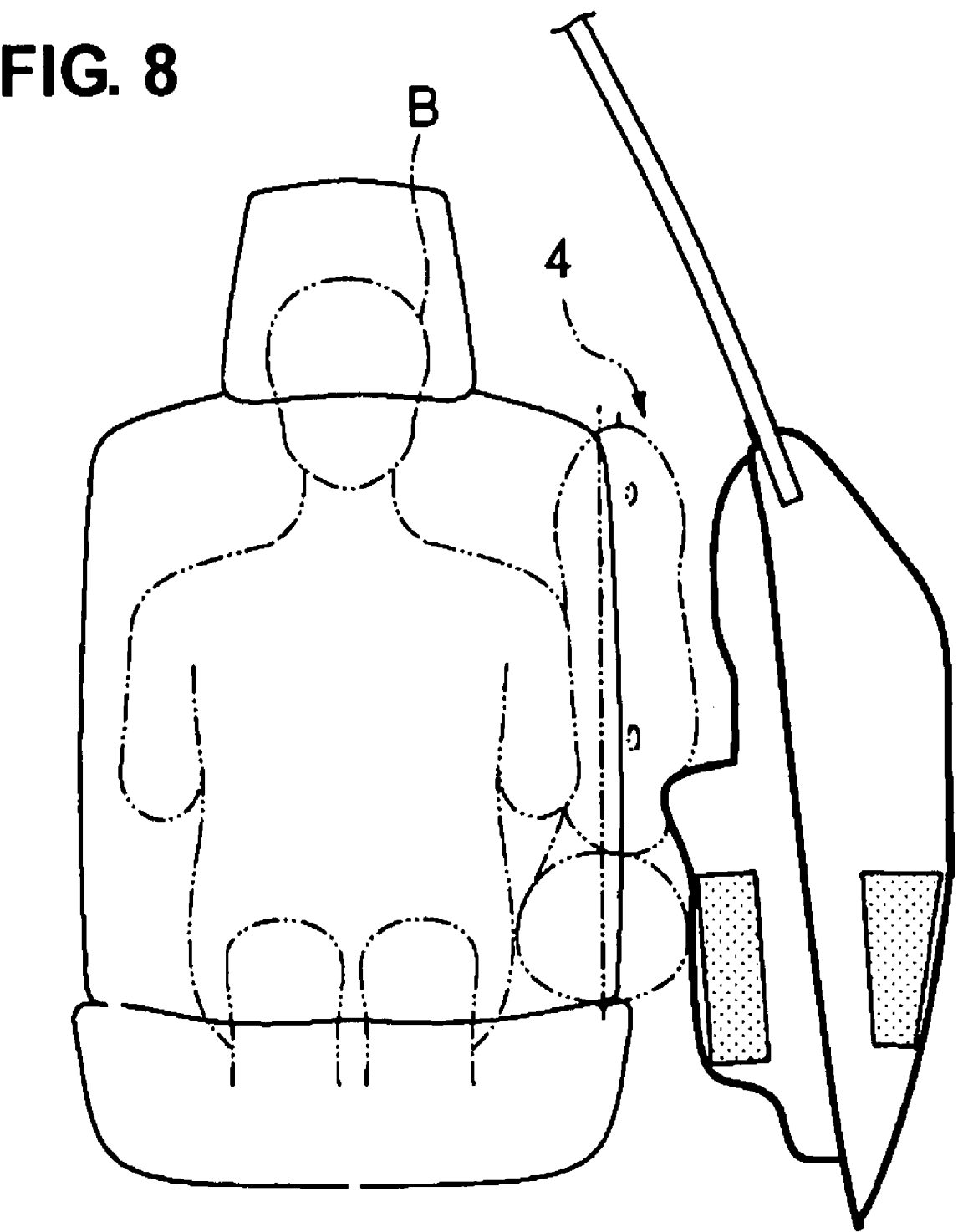
FIG. 8 is a diagram showing an inflation state of the side airbag device according to the first embodiment of the present invention, in which an occupant having a small body size is seated, when viewed from the vehicle front.

Subsequently, an operation of the side airbag device of the above-described first embodiment will be described. When the sensor (not illustrated) detects the vehicle side crash or predicts the vehicle overturn, specifically the specified inclination of the vehicle, the gas is supplied from the inflator 6 and thereby the airbag 4 is inflated as shown in FIGS. 7 and 8. The waist protection portion 10 of the airbag 4 inflates and can protect the waist of the occupant A by pushing it out laterally.

Herein, since the recess 16 is provided at the chest-abdomen protection portion 8 of the airbag 4, this protection portion 8 can be properly inflated with a relatively small amount of gas volume. Namely, the inflation of the chest-abdomen protection portion 8 can be improved even with the gas of small amount of volume, so that the chest-abdomen protection portion 8 can secure its vertically-long enough protection area even for the occupant A having the relatively large body size, thereby improving the occupant's protection.

Moreover, since the recess 16 is provided at the upper portion of the chest-abdomen protection portion 8 of the airbag 4, the upper arm portion B1 of the occupant B having the relatively small body size can be properly prevented from being pushed inwardly by the inflated chest-abdomen protection portion 8.

Also, the waist protection portion 10 of the airbag 4 inflates so as to contact the seat face of the seat cushion 1*a* of the seat when the airbag is inflated. Herein, since the waist protection portion 10 is connected to the chest-abdomen protection portion 8 via the connection portion 12*a*, the inflation of the waist protection portion 10 can be properly stabilized. Herein, the chest-abdomen protection portion 8 may receive a reaction force from the seat cushion 1*a* via the waist protection portion 10 that inflates contacting the seat face of the seat cushion 1*a*. However, since the recess 16 is formed at the upper half part of the chest-abdomen protection portion 8, which is properly apart from the seat cushion 1*a*, any stress can be prevented from concentrating improperly and any deterioration of the inflation of the chest-abdomen protection portion 8 can be avoided.

Moreover, since any stress that may act upward from the waist protection portion 10 at the inflation of the airbag 4 is concentrated on the recess 16, the upper portion of the chest-abdomen protection portion 8 can be properly prevented from being moved upward by the stress. Thereby, the airbag 4 can be inflated properly so as to suit any body sized occupant.

Figure 6:
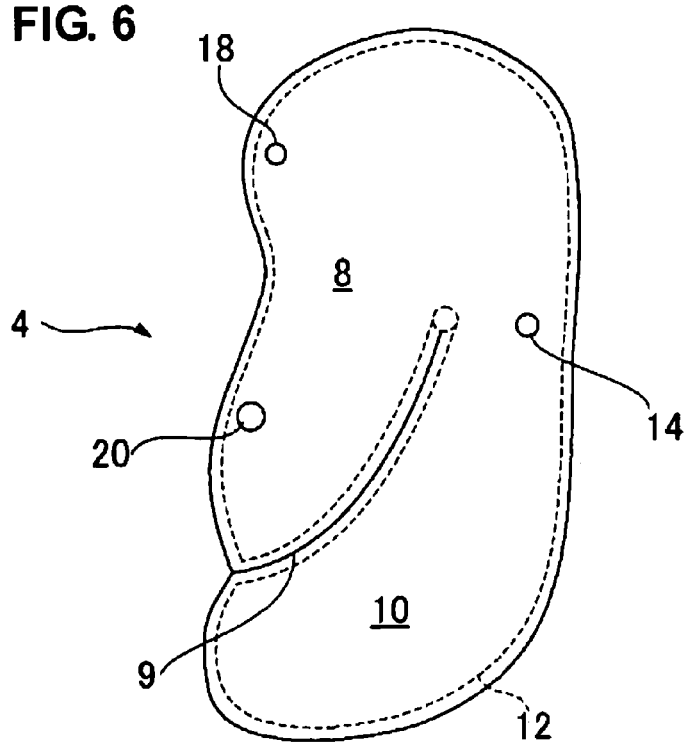
FIG. 6 is a side view of an airbag of a second modified embodiment of the first embodiment of the present invention.

Herein, as a second modified embodiment of the present embodiment, a non-connection portion 9 may be provided between the waist protection portion 10 and the chest-abdomen protection portion 8 as shown in FIG. 6 so that a connection between these portion 8, forms a substantially non-connection state. Thereby, while the inflation of the waist protection portion 10 might deteriorate to a certain degree because the waist protection portion 10 cannot inflate with the chest-abdomen protection portion 8 as an unit, the chest-abdomen protection portion 8 receives little reaction force from the seat cushion 1*a* via the waist protection portion 8 that inflates contacting the seat face of the seat cushion 1*a*. Accordingly, the inflation of the chest-abdomen protection portion 8 can improve.

Since the upper vent hole 18 and the lower vent hole 20 are formed apart from each other at the chest-abdomen protection portion 8, the pressure of this portion 8 can be equalized.

Since the chest-abdomen protection portion 8 of the airbag 4 is configured so that the gas from the gas inlet port 14 flows down to the lower vent hole 20 passing the upper vent hole 18 or near the vent hole 18, the upper portion where the occupant' chest is located can be promptly pressurized. Accordingly, the proper protection of the chest can be obtained.

Also, the upper vent hole 18 has the smaller size than the lower vent holes 20 so that the exhaust-gas amount from the upper vent hole 18 is smaller than that from the lower vent hole 20. Thereby, a flow amount of a high-temperature exhaust gas toward the chest portion (including a shoulder or a side) that has much exposure of occupant's skin may be restricted, so the occupant can be prevented from feeling uncomfortable. Further, while the gas flows down to the lower vent hole 20 passing the upper vent hole 18 or near the vent hole 18, the exhaust gas amount from the upper vent hole 18 is properly reduced in the present embodiment. Accordingly, the high pressurization of the lower portion of the chest-abdomen protection portion 8 can be secured.

Further, since the upper vent hole 18 is formed near the front-edge-portion upper 8*b* and the lower vent hole 20 is formed near the front-edge-portion lower 8*c*, the gas can be exhausted from the front portion of the chest-abdomen protection portion 8 of the airbag 4. And, since these portions where the vent holes 18, 20 are formed become wider at the inflation, these vent holes 18, 20 can be prevented from being closed at the vehicle side crash or the vehicle turnover. Accordingly, the gas exhaustion our of these vent holes can be secured.

Since no vent hole is formed at the waist protection portion 16; the upper connection area 13 is provided at the upper portions of the both protection portions 8, 10, and the gas inlet portion 14 is formed at the rear portion near the connection area 13, it can be possible to hold the high pressure state. Moreover, since the gas exhaust amount from the upper vent hole 18 formed at the chest-abdomen protection portion 8 is relatively small, the upper vent hole 18 may not affect the high pressurization of the waist protection portion 10 improperly.

Figure 9:
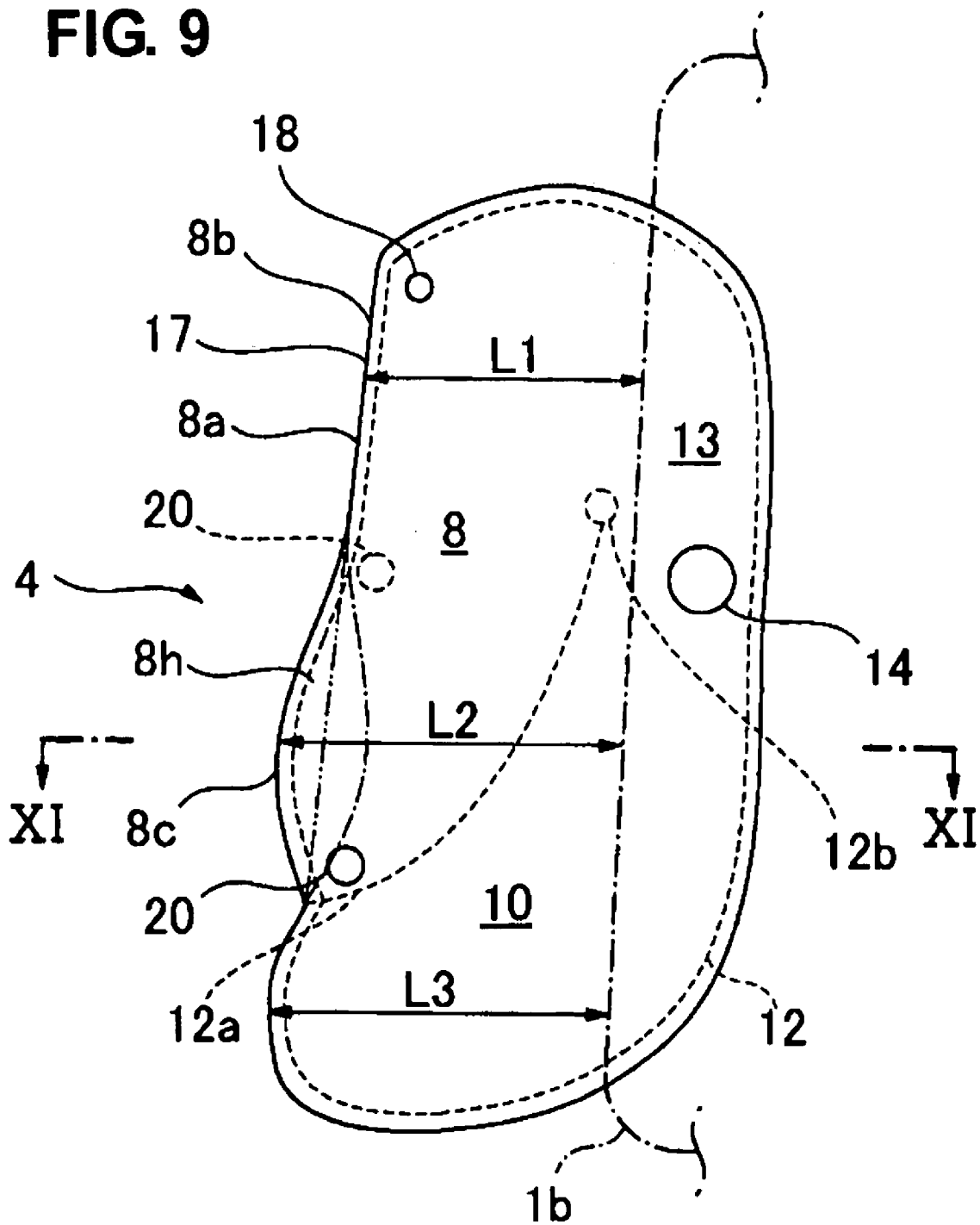
FIG. 9 is a side view of an airbag of a third modified embodiment of the first embodiment of the present invention.
Figure 10:
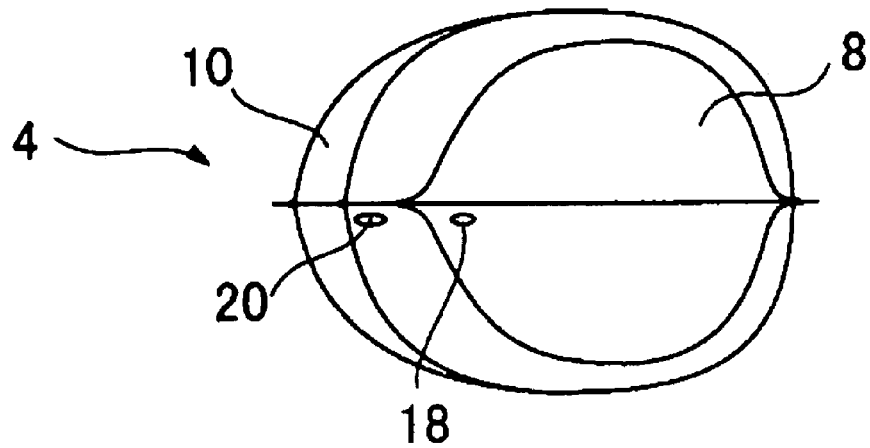
FIG. 10 is a plan view of the airbag of the side airbag device of FIG. 9.

Next, a third modified embodiment of the airbag 4 according to the first embodiment will be described with FIGS. 9 and 10. FIG. 9 is a side view of the inflated airbag. FIG. 10 is a plan view of the airbag of FIG. 9. A basic structure of the airbag 4 of the third modified embodiment is the same as that of the airbag 4 shown in FIG. 2, so different structure and operation from those of the airbag 4 of FIG. 2 will be described mainly.

In the present modified embodiment, the airbag 4 is formed such that the front-edge-portion upper 8b is shifted toward the seat back 1b so as to extend substantially in parallel to a vertical direction of a front face (an occupant's back leaning face) of the seat back 1b. Thus, a recess 17 that is formed so as to retreat rearward at the front-edge-portion upper 8b. Accordingly, a horizontal distance L1 between the front-edge-portion upper 8b and the front face of the seat back 1b is shorter than a horizontal distance L2 between the front-edge-portion lower 8c (particularly, a foremost portion of the front-edge-portion lower 8c) and the front face of the seat back 1b (L1<L2). The front-edge-portion lower 8c is formed in a curve shape such that a middle portion thereof in the vertical direction protrudes forward, when viewed from the vehicle width direction. Also, the distance L2 is longer than a horizontal distance L3 between a foremost portion of a front edge of the waist protection portion 10 and the front face of the seat back 1b (L3<L2).

In the present modified embodiment, the connection portion 12a partitioning the airbag 4 into the chest-abdomen protection portion 8 and the waist protection portion 10 by sewing extends upward farther than that of the airbag 4 shown in FIG. 2, and the non-inflatable portion 12b is located above the gas inlet portion 14. The connection portion 12a extends from the middle portion of the front edge portion of the airbag 4 in the vertical direction (a lower end of the front-edge-portion lower 8c) upward and rearward, which forms the chest-abdomen protection portion 8 such that the portion 8 extends vertically. The gas inlet port 14 of the present modified embodiment has a larger diameter than the one shown in FIG. 2, so that the gas can be supplied into the airbag more promptly so as to reduce an inflation time.

The upper vent hole 18 is formed near the upper end of the front-edge-portion upper 8b like the embodiment shown in FIG. 2. The lower vent hole 20 is formed at a location where the vent hole 20 would not be closed (covered) by a protruding portion 8h of the front-edge-portion lower 8c when the front-edge-portion lower 8c is folded inside the airbag 4 toward the seat back 1b with a folding line that extends along the front-edge-portion upper 8b. Specifically, the lower vent hole 20 is formed near a lower end of the front-edge-portion lower 8c and a front end of the connection portion 12a. Herein, the lower vent hole 20 may be formed near an upper end of the front-edge-portion lower 8c as shown in an imaginary line in FIG. 9, or there may be two holes 20 at both portions.

In the present modified embodiment, the gas inlet port 14 has the larger diameter than the one shown in FIG. 2 and the non-inflatable portion 12b is formed above the gas inlet port 14, so that the waist protection portion 10 can be promptly inflated to protect the waist portion of the occupant. Herein, while the gas flowing around the non-inflatable portion 12b is supplied from the upper portion toward the lower portion of the chest-abdomen protection portion 8, there is a concern that the inflation of the lower portion of the chest-abdomen protection portion 8 would be delayed in a case where the gas has a low pressure and a small amount of volume. According to the present modified embodiment, however, since the recess 17 is formed at the front-edge-portion upper 8b of the chest-abdomen protection portion 8 and thereby the volume of the upper portion of the chest-abdomen protection portion 8 is reduced, the chest-abdomen protection portion 8 can inflate substantially at the same time as the waist protection portion 10 or otherwise at a slightly delayed timing even with the low gas pressure and low gas volume. Thus, the properly prompt inflation can be obtained and the proper protection of the chest and abdomen of the occupant can be provided.

In the present modified embodiment, while the protruding portion 8h inflates lastly, it is formed so as to connect to the waist protection portion 10. Accordingly, the chest-abdomen protection portion 8 including the protruding portion 8h can be inflated by the waist protection portion 10 pulling this portion 8.

Also, since the airbag 4 is configured such that the front-edge-portion upper 8b retreats rearward compared to the front-edge-portion lower 8c, the upper arm portion of not only the small-sized occupant B but a middle-sized occupant between the large-sized occupant A and the small-sized occupant B (for instance, an occupant having an average body size of American female adults who belong to a middle body size group that ranks 50% from the smallest one, which is referred to as AF50 in the US Federal Regulation Standard CRF 49ch. 5) can be properly prevented from being pushed inwardly by the inflated chest-abdomen protection portion 8 of the airbag 4. Accordingly, the occupant can be prevented from receiving any impact from the inflated chest-abdomen protection portion 8 regardless of the body size of occupant. Herein, while a hole part of the front-edge-portion upper 8b from its lower end to its upper end is formed to retreat rearward compared to the front-edge-portion lower 8c in the present modified embodiment, part of the front-edge-portion upper 8b from its lower end to its middle portion may be formed to retreat rearward.

Figure 11:
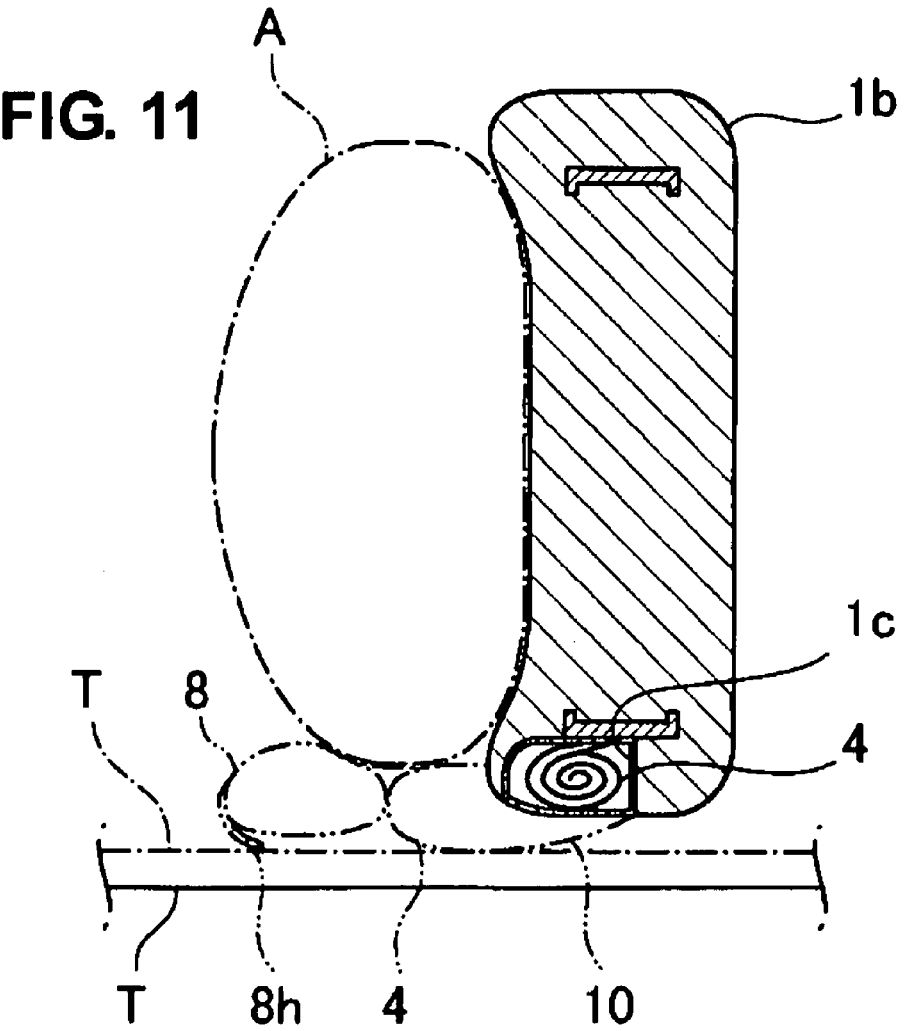
FIG. 11 is an explanatory diagram of the airbag, which corresponds to a sectional view taken along line XI-XI of FIG. 9.

FIG. 11 is an explanatory diagram that corresponds to a sectional view taken along line XI-XI of FIG. 9. The airbag 4 is folded in a space portion 1c that is formed outside in the seat back 1b as shown in this figure. In the present modified embodiment, the airbag 4 is folded in such a manner that it is rolled up from its front edge side to its rear edge side. While the airbag 4 of the present modified embodiment is folded in a roll style, it may be folded in a bellow style.

As shown by an imaginary line in FIG. 11, when the chest-abdomen protection portion 8 of the airbag 4 inflates by being pulled out of the space portion 1c by the waist protection portion 10 toward the occupant A, the protruding portion 8h of the front-edge-portion lower 8c inflates lastly because it is located far from the gas inlet portion 14. Hence, there is a concern that if a trim T moved toward the vehicle seat 1 before the inflation of the protruding portion 8h was completed, the protruding portion 8h would get stuck between the trim T and the occupant A and not be properly inflated.

However, since the present modified embodiment is configured such that the lower vent hole 20 is not closed (covered) by the protruding portion 8h even if this portion 8h remains folded without inflating, the equalization of pressure of the chest-abdomen protection portion 8 can be attained.

Figure 12:
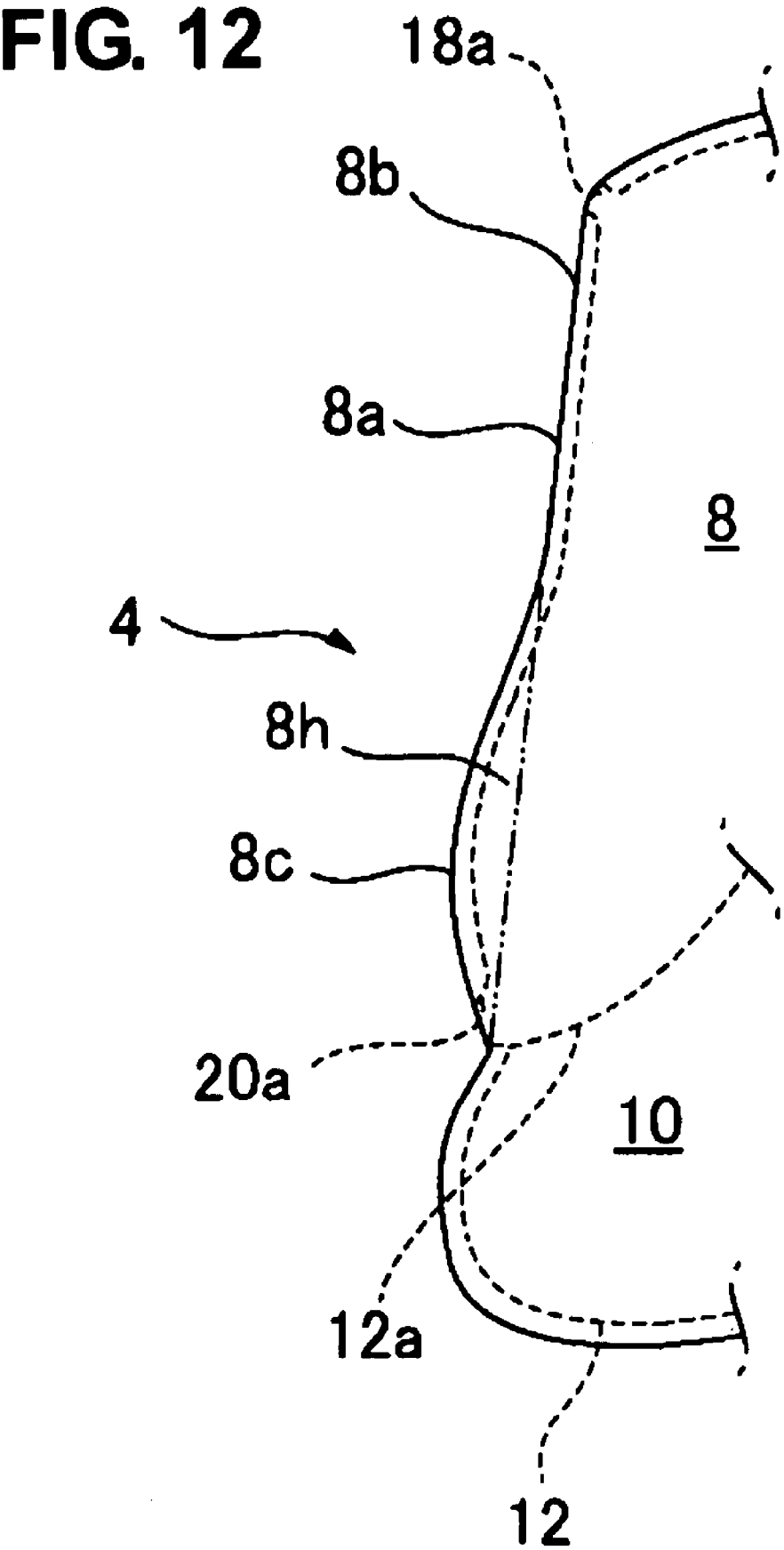
FIG. 12 is a partial side view of an airbag of a fourth modified embodiment of the first embodiment of the present invention.

Further, a fourth modified embodiment shown in FIG. 12 may be applied. Herein, respective vent holes 18a, 20a are respectively formed by the front edge portion 8a of the chest-abdomen protection portion 8 that is not closed entirely by the sewing portion 12. The upper vent hole 18a is formed at the upper end of the front-edge-portion upper 8b, and the lower vent hole 20a is formed at the lower end of the front-edge-portion lower 8c. The lower vent hole 20a may be formed at the front end of the front-edge-portion lower 8c. This modified embodiment can attain the equalization of pressure of the chest-abdomen protection portion 8 in the case where the portion 8h remains folded without inflating, like the third modified embodiment.

Figure 13:
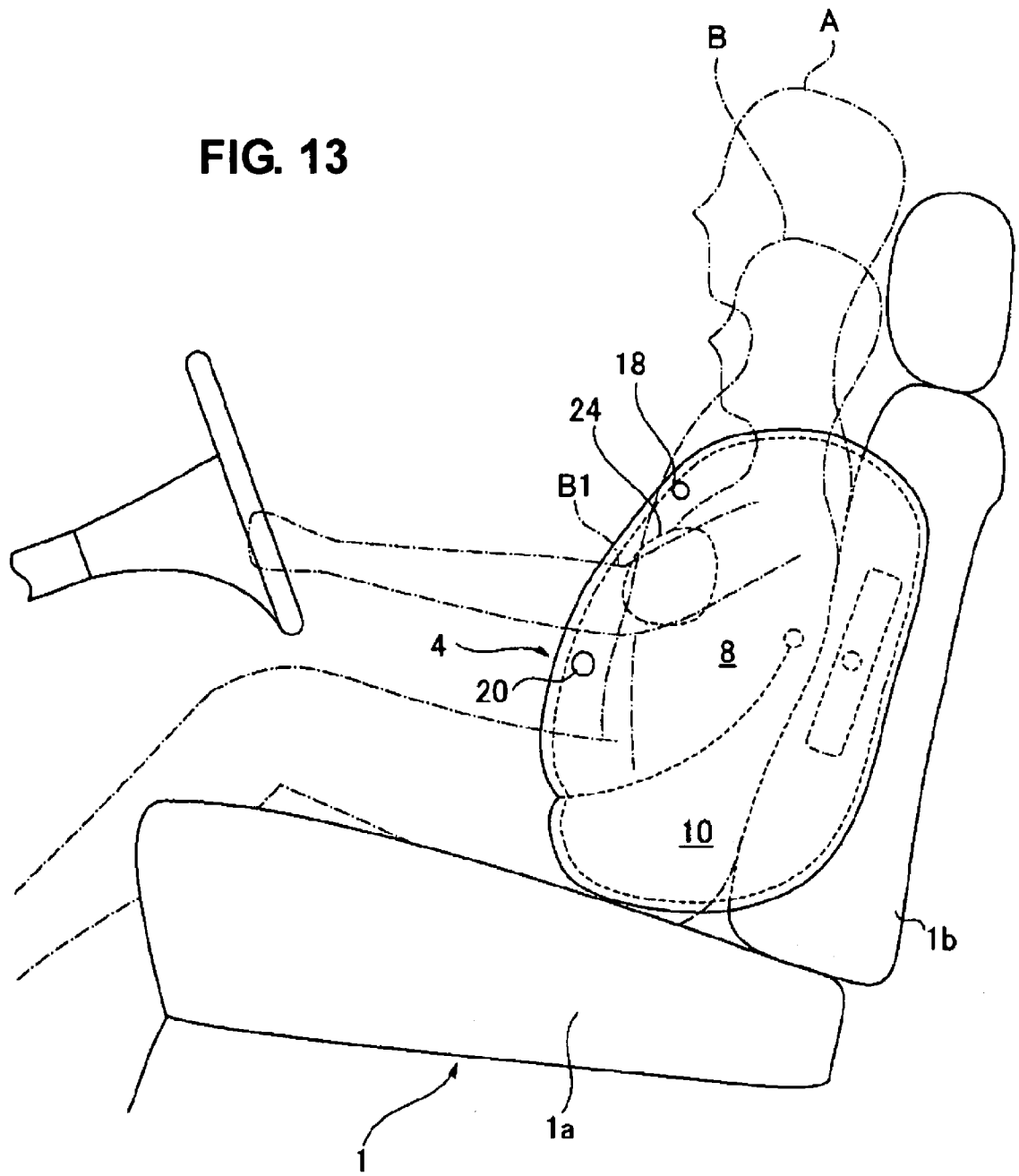
FIG. 13 is a diagram showing an inflation state of a side airbag device according to a second embodiment of the present invention, when viewed from the vehicle width direction.
Figure 14:
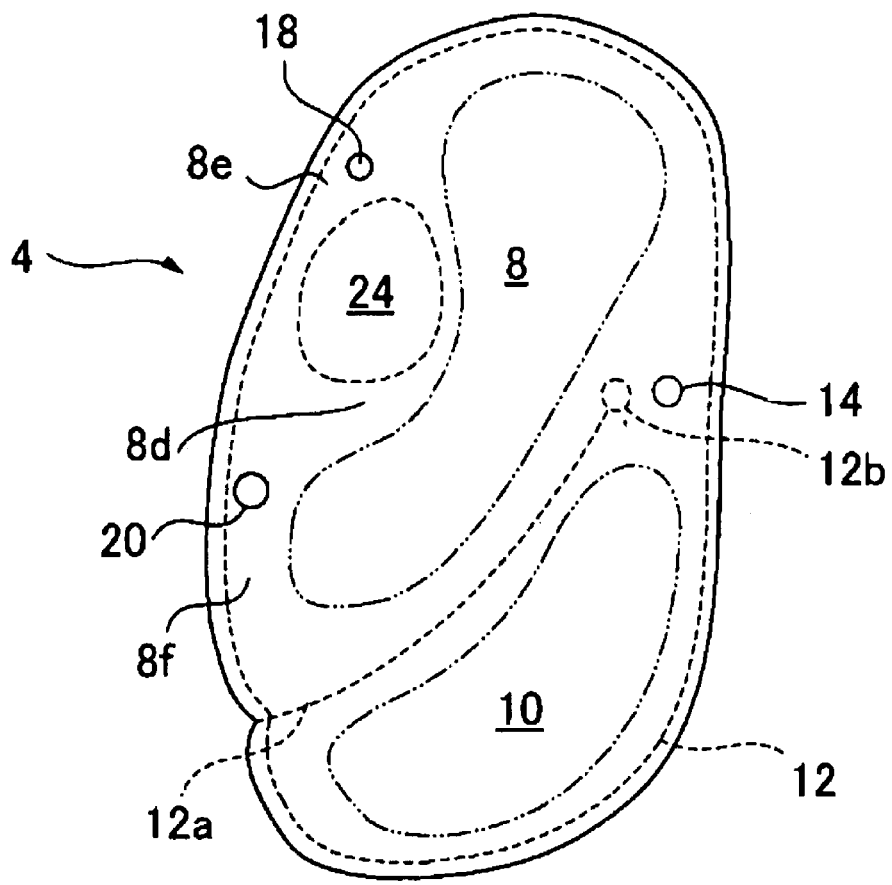
FIG. 14 is a side view of an airbag of the side airbag device of FIG. 13.
Figure 15:
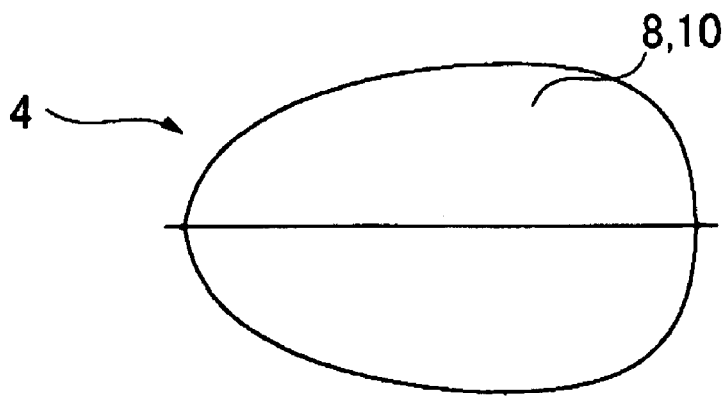
FIG. 15 is a plan view of the airbag of the side airbag device of FIG. 13.
Figure 16:
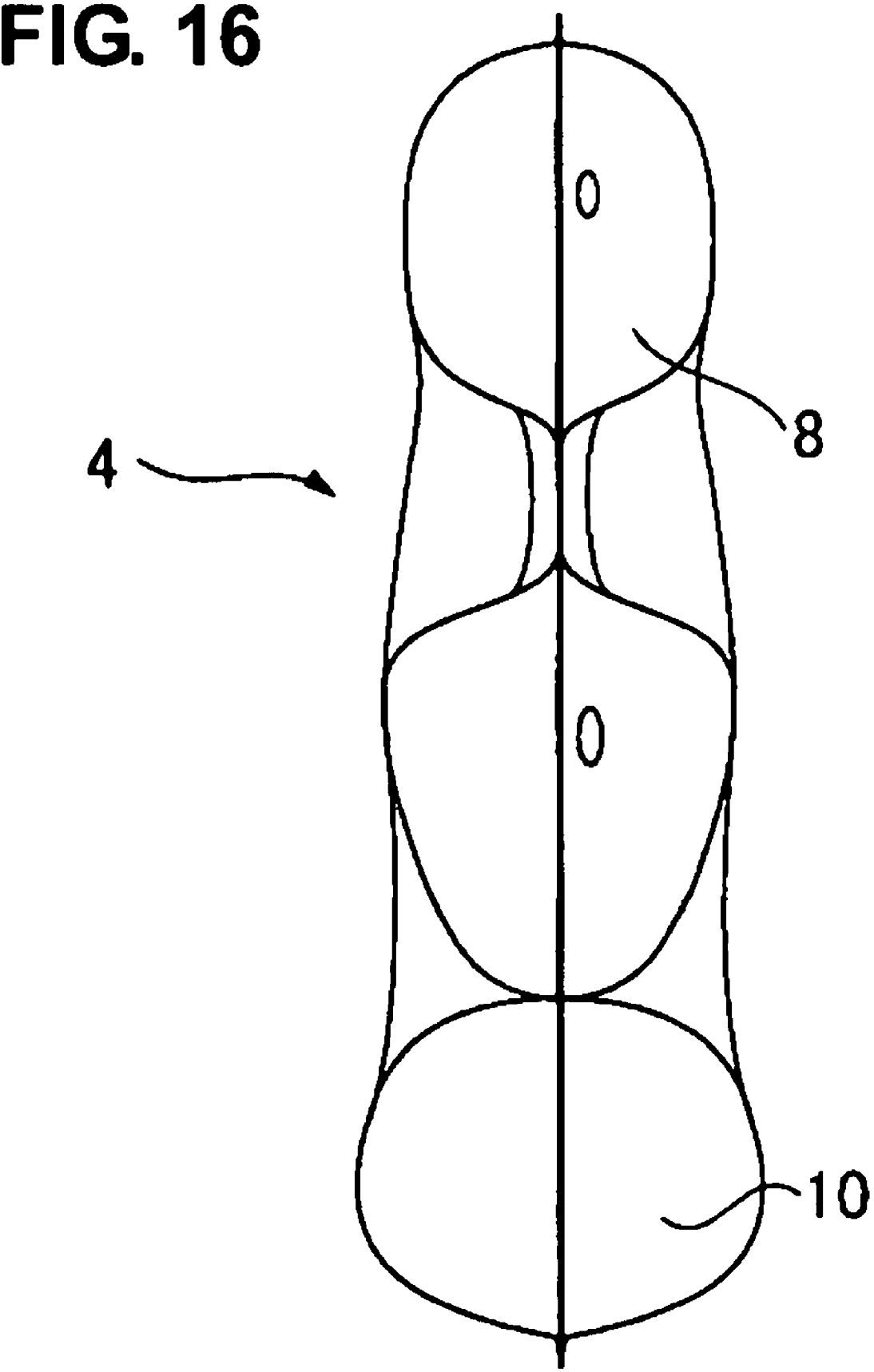
FIG. 16 is an elevation view of the airbag of the side airbag device of FIG. 13.

Next, a side airbag device according to a second embodiment of the present invention will be described with FIGS. 13 to 16. FIG. 13 is a diagram showing an inflation state of the side airbag device according to the second embodiment of the present invention, when viewed from the vehicle width direction. FIG. 14 is a side view of the airbag of the side airbag device of FIG. 13. FIG. 15 is a plan view of the airbag of the side airbag device of FIG. 13. FIG. 16 is an elevation view of the airbag of the side airbag device of FIG. 13. The basic structure of the second embodiment is the same as that of the first embodiment, so only different structures from those of the first embodiment will be described mainly.

While the recess 16 is formed at the chest-abdomen protection portion 8 in the above-described first embodiment, an non-inflatable portion 24 is formed, instead of the recess 16, by sewing part of clothes at or near a portion of the chest-abdomen protection portion 8, which corresponds to the upper arm portion B1 of the occupant having the relatively small body size (the occupant B corresponding to AF05 described above, for instance). This non-inflatable portion 24 is formed at the upper half part of the chest-abdomen protection portion 8 and its front portion. And, the non-inflatable portion 24 is enclosed by an inflation area 8d entirely.

The upper and lower vent holes 18, 20 of the chest-abdomen protection portion 8 are respectively formed at a front upper portion 8e and a front lower portion 8f, which are respectively located above and below the non-inflatable portion 24. More specifically, as shown in FIG. 14, these vent holes 18, 20 are provided at a specified portion (outside an area shown by a two-dotted broken line in FIG. 14) of the chest-abdomen protection portion 8, whose longitudinally-and-vertically extending face has a relatively large inclination, when viewed from the longitudinal direction and the vertical direction of the vehicle at the inflation. Herein, either one of these vent holes 18, 20 may be provided.

The above-described side airbag device of the second embodiment of the present invention can perform the similar operations as the side airbag device of the first embodiment.

Figure 17:
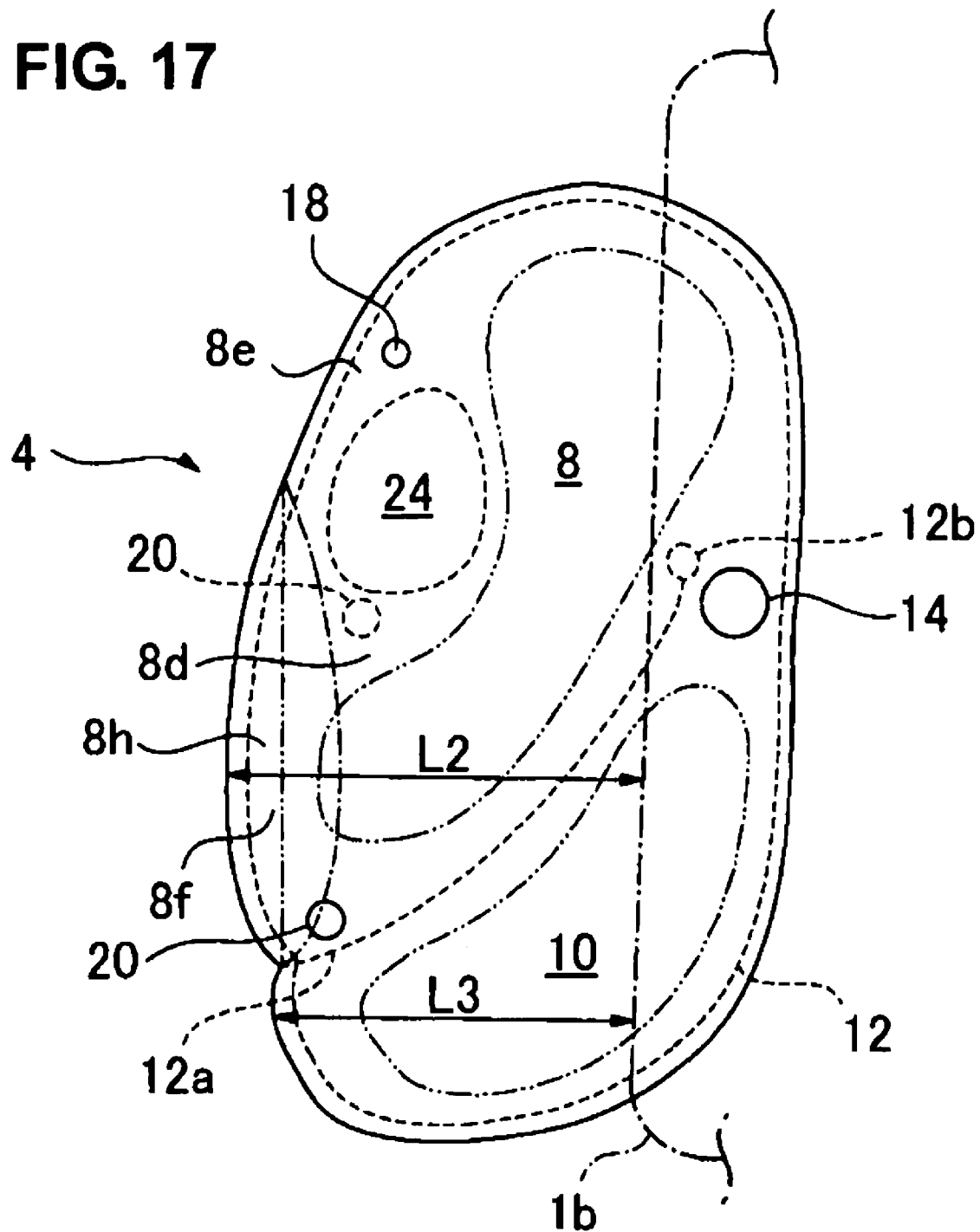
FIG. 17 is a side view of an airbag of a first modified embodiment of the second embodiment of the present invention.

Next, a first modified embodiment of the airbag 4 of the second embodiment will be described referring to FIG. 17. FIG. 17 is a side view of this airbag. The airbag 4 of the first modified embodiment is the same as the airbag shown in FIG. 14 in its basic structure and contour. Hence, only different structure and operation of the airbag 4 of the first modified embodiment will be described.

In the present modified embodiment, the connection portion 12a partitioning the airbag 4 into the chest-abdomen protection portion 8 and the waist protection portion 10 extends further upward than that of the airbag shown in FIG. 14 and the non-inflatable portion 12b is located above the gas inlet port 14. Herein, the gas inlet port 14 of the present modified embodiment has a larger diameter than the one shown in FIG. 14, so that the gas can be supplied into the airbag more promptly so as to reduce the inflation time.

The upper vent hole 18 is at the front upper portion 8e like the embodiment shown in FIG. 14. At the front lower portion 8f of the chest-abdomen protection portion 8 is provided the protruding portion 8h that protrudes forward from the front end portion of the connection portion 12a and the waist protection portion 10 (L2>L3). The lower vent hole 20 is formed at a location where the vent hole 20 would not be closed by the protruding portion 8h when it is folded inside the airbag 4 toward the seat back 1b with a folding line extending in parallel to the seat back 1b. Specifically, the lower vent hole 20 is formed near the lower end of the front lower portion 8f and the front end of the connection portion 12a. Herein, the lower vent hole 20 may be formed near an upper end of the front lower portion 8f as shown in an imaginary line in FIG. 17, or there may be two holes 20 at both portions.

In the present modified embodiment, the gas inlet port 14 has the larger diameter than the one shown in FIG. 14 and the non-inflatable portion 12b is formed above the gas inlet port 14, so that the waist protection portion 10 can be promptly inflated to protect the waist portion of the occupant.

Further, like the embodiment shown in FIG. 9, since the present modified embodiment is configured such that the lower vent hole 20 is not closed by the protruding portion 8h even if this portion 8h remains folded without inflating, the equalization of pressure of the chest-abdomen protection portion 8 can be attained.

Figure 18:
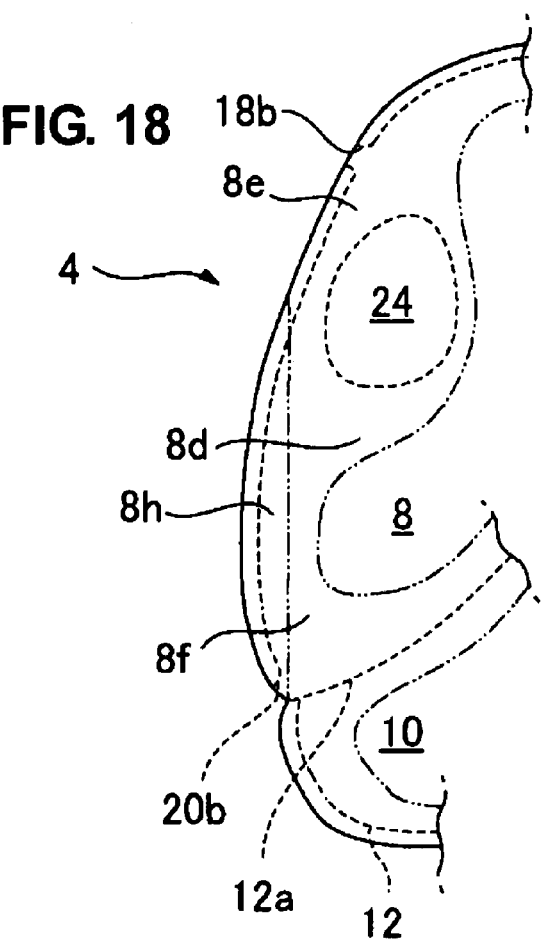
FIG. 18 is a side view of an airbag of a second modified embodiment of the second embodiment of the present invention.

Further, a second modified embodiment shown in FIG. 18 may be applied. Herein, respective vent holes 18b, 20b are respectively formed by the front edge portion of the chest-abdomen protection portion 8 that is not closed entirely by the sewing portion 12. The upper vent hole 18b is formed at the front upper portion 8e, and the lower vent hole 20b is formed at the lower end of the front lower portion 8f. The lower vent hole 20a may be formed at the front end of the front lower portion 8f. This modified embodiment can attain the equalization of pressure of the chest-abdomen protection portion 8 in the case where the portion 8h remains folded without inflating, like the first modified embodiment.

Figure 19:
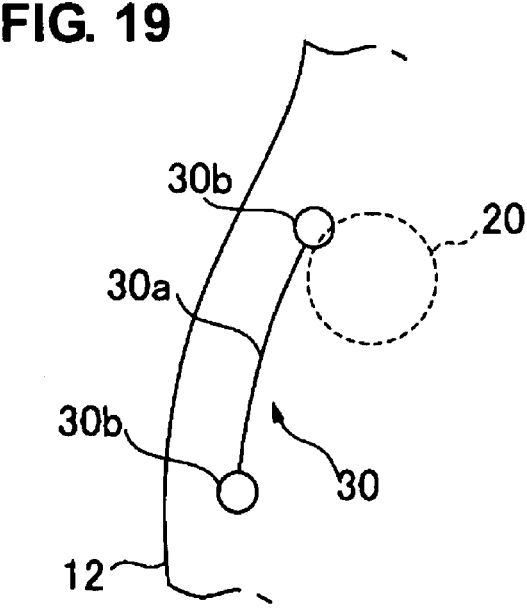
FIG. 19 is a side view showing a first example of a shape of vent holes according to a third embodiment of the present invention.
Figure 20:
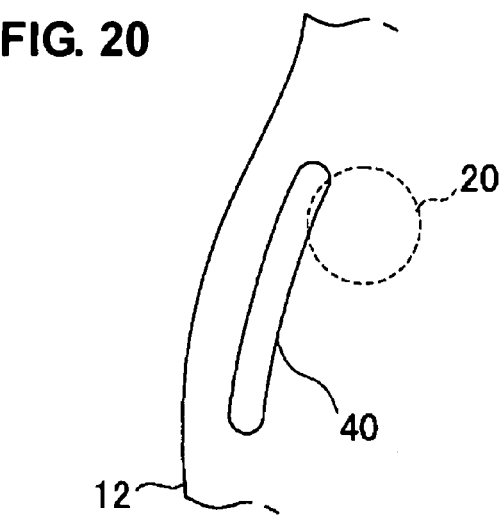
FIG. 20 is a side view showing a second example of the shape of the vent holes according to the third embodiment of the present invention.
Figure 21:
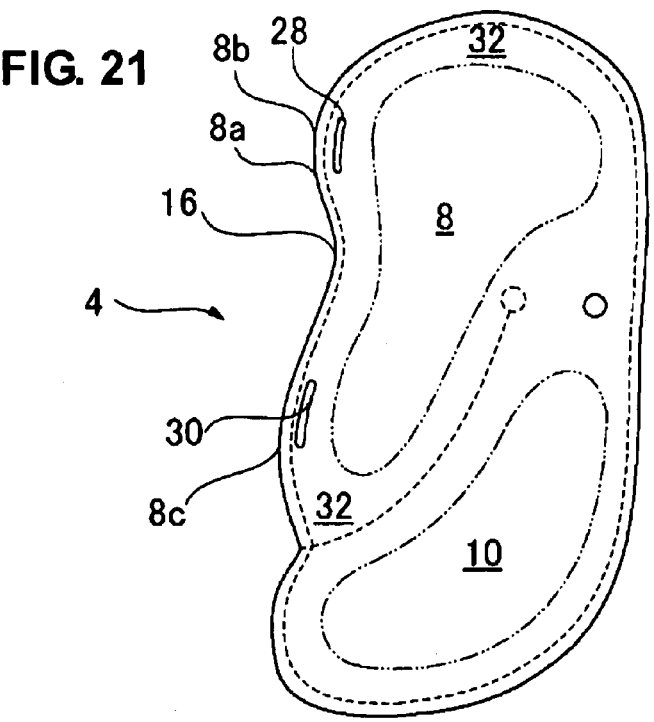
FIG. 21 is a diagram showing an inflation state of an airbag device according to the third embodiment of the present invention, when viewed from the vehicle width direction.
Figure 22:
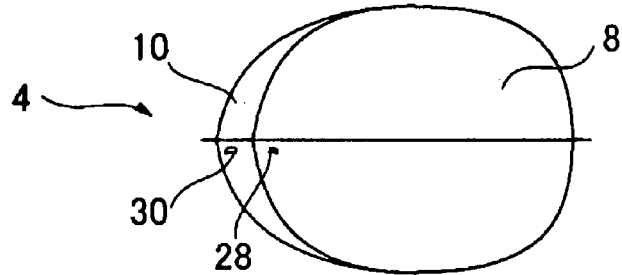
FIG. 22 is a plan view of the airbag of FIG. 21.
Figure 23:
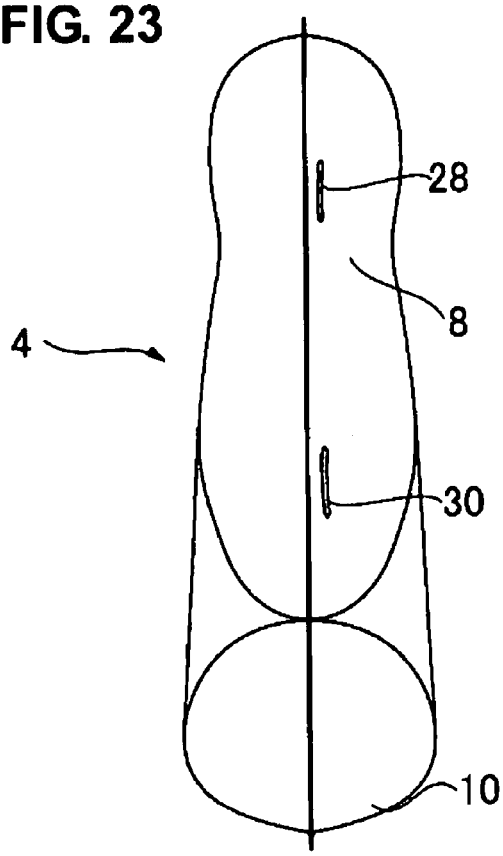
FIG. 23 is an elevation view of the airbag of FIG. 21.
Figure 24:
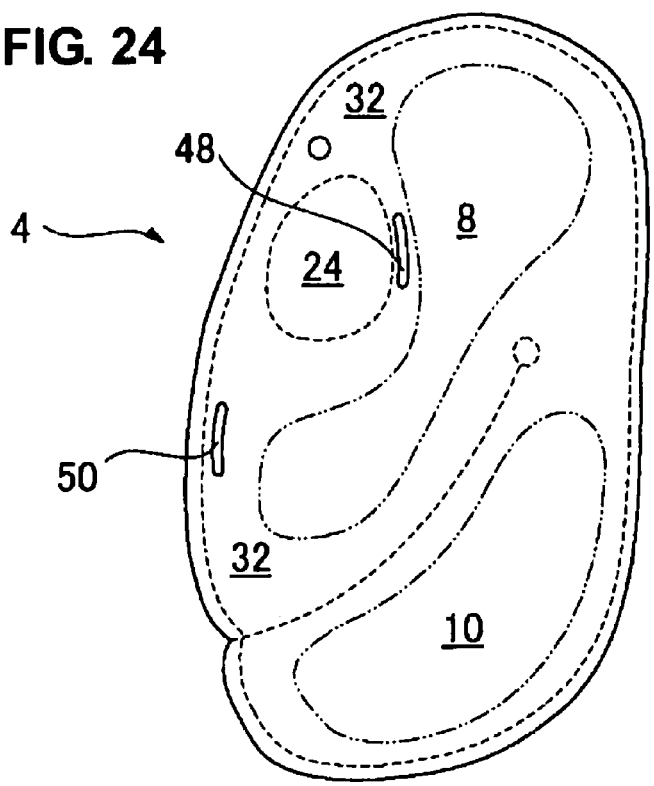
FIG. 24 is a diagram showing an inflation state of an airbag according to a modified embodiment of the third embodiment of the present invention, when viewed from the vehicle width direction.

Next, a side airbag device of a third embodiment of the present invention will be described with FIGS. 19 to 24. FIG. 19 is a side view showing a first example of a shape of vent holes according to the third embodiment of the present invention. FIG. 20 is a side view showing a second example of the shape of the vent holes according to the third embodiment of the present invention. FIG. 21 is a diagram showing an inflation state of the airbag device according to the third embodiment of the present invention, when viewed from the vehicle width direction. FIG. 22 is a plan view of the airbag of FIG. 21. FIG. 23 is an elevation view of the airbag of FIG. 21. FIG. 24 is a diagram showing an inflation state of an airbag according to a modified embodiment of the third embodiment of the present invention, when viewed from the vehicle width direction. The basic structure of the third embodiment is the same as that of the first embodiment or the second embodiment, so only different structures from those of the first embodiment or the second embodiment will be described mainly.

In the third embodiment, the slit-shaped upper and lower vent holes 28, 30 are formed at the chest-abdomen protection portion 8 instead of the circular vent holes of the first or second embodiments (only the lower vent hole 30 is shown in FIG. 19). The circular lower vent hole 20 of the first or second embodiments is just illustrated by a broken line in FIG. 19. As shown here, the lower vent hole 30 comprises a slit portion 30a and small holes 30b formed at its both ends. The upper vent hole 28, likewise, comprises its slit portion and small holes.

Moreover, the elongated upper and lower vent holes 38, 40 may be applied as shown in FIG. 20 (only the lower vent hole 40 is shown in FIG. 20) instead of the circular vent holes. Likewise, the circular lower vent hole 20 of the first or second embodiments is just illustrated by a broken line in FIG. 20.

More specifically, in the present embodiment as shown in FIGS. 21 to 23, the upper and lower vent holes 28, 30 are respectively located near the front-edge portion upper 8b and the front-edge-portion lower 8c and formed in the slit or elongated hole shape so as to extend substantially along the contour of the front edge portion 8a. Herein, the length of the vent holes 28, 30 is set to be about 5-10 cm.

Also, these vent holes 28, 30 are formed such that the gas exhausted out of these holes is directed forward.

The recess 16 is provided at or near the portion of the chest-abdomen protection portion 8, which corresponds to the upper arm portion B1 of the occupant B having the relatively small body size so as to retreat rearward at the front edge portion 8a of the chest-abdomen protection portion 8 between the front-edge-portion upper 8*b* and the front-edge-portion lower 8*c*. The upper and lower vent holes 28, 30 are respectively provided near the front-edge-portion upper 8*b* and the front-edge-portion lower 8*c*.

Herein, either one of these vent holes may be provided.

Further, the upper and lower vent holes 28, 30 are located so that a line (extension line) along a longitudinal direction of each hole has a substantially right angle or a specified slanted angle relative to the seat face of the seat cushion 1*a* of the seat 1.

These vent holes 28, 30 are formed in the slit or elongated hole shape along the contour of the front edge portion 8*a* and provided at a specified portion 32 (outside an area shown by a two-dotted broken line in FIG. 21) of the chest-abdomen protection portion 8, whose longitudinally-and-vertically extending face, namely the face formed by the sewing portion 12, has a relatively large inclination, when viewed from the longitudinal direction and the vertical direction of the vehicle at the inflation.

Next, a modified embodiment of the third embodiment will be described with FIG. 24. The non-inflatable portion 24 enclosed by the inflation area 8*d* is formed at or near the portion of the chest-abdomen protection portion 8 of the airbag 4 which corresponds to the upper arm portion of the occupant having the relatively small body size as shown in FIG. 24. Further, the upper vent hole 48 formed in the slit or elongated hole shape is formed just behind the non-inflatable portion 24 as shown. The lower vent hole 50 is similar to the one shown in FIG. 21.

Similarly to the third embodiment shown in FIG. 21, these vent holes 48, 50 of the present modified embodiment are formed in the slit or elongated hole shape along the boundary of the chest-abdomen protection portion 8 and provided at the specified portion 32 (outside an area shown by a two-dotted broken line in FIG. 24) of the chest-abdomen protection portion 8, whose face has a relatively large inclination, when viewed from the longitudinal direction of the vehicle at the inflation.

The above-described side airbag device of the third embodiment and the modified embodiment of the present invention can perform the similar operations to the side airbag device of the first embodiment and the second embodiment. Herein, the upper vent holes 28, 38 and the lower vent holes 30, 40 are formed in the slit or elongated hole shape as described above, the side airbag device of the third embodiment and the modified embodiment can perform the following operations.

Initially, according to the side airbag device of the third embodiment and the modified embodiment, since the upper vent holes 28, 38 and the lower vent holes 30, 40 of the chest-abdomen protection portion 8 are formed in the slit or elongated hole shape, the opening area of these holes is enlarged when the chest-abdomen protection portion 8 is under a high pressure of the gas from the inflator 6. Accordingly, a large amount of gas is exhausted within a short period, thereby improving the impact absorption. While, when the chest-abdomen protection portion 8 shrinks with the gas pressure reduced, the opening area of these holes 28, 38 and 30, 40 is narrowed. Accordingly, the amount of the gas exhaustion reduces, thereby enabling a soft protection with a relatively long period.

Further, since the upper and lower vent holes 28, 30 are formed along the contour of the front edge portion 8*a* and provided at the specified portion 32 of the chest-abdomen protection portion 8 whose face has the relatively large inclination, the above-described impact absorption can be further improved and then the soft protection with the relatively long period can be attained.

In the modified embodiment of the third embodiment, likewise, since the vent hole 48 is formed along the contour of the boundary of the non-inflatable portion 24, the impact absorption can be further improved and then the soft protection with the relatively long period can be attained.

Also, since the vent holes 28, 38 and 30, 40 are formed such that the gas exhausted out of these holes is directed forward, the high temperature gas can be prevented from blowing on the occupant directly.

In a case where the airbag 4 inflates so as to contact the seat face of the seat cushion 1*a* of the seat 1, the airbag 4 receives the reaction force from the seat cushion 1*a*. This reaction force might press the vent hole in such a manner that the vent hole is improperly deformed, thereby preventing the smooth gas exhaustion. Herein, the upper vent holes 28, 30 and the lower vent holes 30, 40 of the third embodiment and the modified embodiment are located so that the line (extension line) along the longitudinal direction of each hole has the substantially right angle or the specified slanted angle relative to the seat face of the seat cushion 1*a* of the seat 1, the above-described problem can be prevented.

While the chest-abdomen protection portion 8 and the waist protection portion 10 are connected via the connection portion 12*a* in the above-described embodiments, these portions 8, 10 may be configured to be separate from each other by the non-connection portion 9 as shown in FIG. 6. Thereby, although the inflation of the waist protection portion 10 might deteriorate to a certain degree because the waist protection portion 10 cannot inflate with the chest-abdomen protection portion 8 as an unit, the chest-abdomen protection portion 8 receives little reaction force from the seat cushion 1*a* via the waist protection portion 8 that inflates contacting the seat face of the seat cushion 1*a*. Accordingly, the inflation of the chest-abdomen protection portion 8 can improve.

The present invention should not be limited to the above-described embodiments, but any other modifications and improvements may be applied within the scope of a sprit of the present invention.

What is claimed is:

1. A side airbag device, which is provided at a seat back of a seat for a vehicle, comprising:

an airbag including a chest-abdomen protection portion operative to inflate so as to protect a chest and an abdomen of an occupant seated in the seat and a waist protection portion operative to inflate so as to protect a waist of the occupant seated; and an inflator operative to supply gas to the airbag for an inflation of the airbag at a vehicle side crash or a vehicle turnover, wherein the chest-abdomen protection portion and the waist protection portion of said airbag are partitioned by a partition portion that extends substantially rearward from a front edge of the airbag so that the chest-abdomen protection portion and the waist protection portion are connected to each other via the partition portion, respective insides of the chest-abdomen protection portion and the waist protection portion are interconnected via an connection area that is formed at a rear portion of the airbag, a gas inlet portion of the airbag, through which the gas supplied from said inflator is supplied, is positioned near a rear end portion of the partition portion so that inflation of the chest-abdomen protection portion and the waist protection portion can be started substantially at the same time, a recess is provided at an upper portion of the chest-abdomen protection portion of the airbag so as to retreat rearward from a front edge portion of the chest-abdomen protection portion, and an upper vent hole and a lower vent hole are provided at the chest-abdomen protection portion of the airbag, the upper vent hole being positioned above said recess, the lower vent hole being positioned below said recess.

2. The side airbag device of claim 1, wherein said waist protection portion is configured to inflate so as to contact a seat face of the seat cushion of the seat when the airbag is inflated.

3. The side airbag device of claim 1, wherein said recess provided at the chest-abdomen protection portion is configured such that a horizontal distance between at least a portion of an upper portion of a front edge portion of the chest-abdomen protection portion and a front face of a seat back of the seat is shorter than a horizontal distance between a lower portion of the front edge portion of the chest-abdomen protection portion and the front face of the seat back of the seat, when viewed from a vehicle width direction.

4. The side airbag device of claim 3, wherein said chest-abdomen protection portion is configured such that a horizontal distance between the lower portion of the front edge portion of the chest-abdomen protection portion and the front face of the seat back of the seat is longer than a horizontal distance between a front edge portion of the waist protection portion and the front face of the seat back of the seat, when viewed from a vehicle width direction, and the lower portion of the chest-abdomen protection portion is folded in such a manner that a front edge side thereof is folded toward a rear edge side thereof.

* * * * *